(12) United States Patent
Kirkman

(10) Patent No.: US 8,196,607 B2
(45) Date of Patent: Jun. 12, 2012

(54) SUBSEA COUPLING

(76) Inventor: Douglas Frederick Kirkman, Ickenham (GB)

( * ) Notice: Subject to any disclaimer, the term of this patent is extended or adjusted under 35 U.S.C. 154(b) by 275 days.

(21) Appl. No.: 12/573,038

(22) Filed: Oct. 2, 2009

(65) Prior Publication Data

US 2010/0084859 A1 Apr. 8, 2010

(51) Int. Cl.
*F16L 37/28* (2006.01)
(52) U.S. Cl. .................... 137/614.04; 137/614
(58) Field of Classification Search .......... 137/614, 137/614.03–614.05
See application file for complete search history.

(56) References Cited

U.S. PATENT DOCUMENTS

| | | | | |
|---|---|---|---|---|
| 4,813,454 A | * | 3/1989 | Smith, III | 137/614.04 |
| 4,900,071 A | * | 2/1990 | Smith, III | 285/379 |
| 5,368,070 A | * | 11/1994 | Bosley | 137/614.04 |
| 5,771,927 A | * | 6/1998 | Johansen et al. | 137/614.04 |
| 6,007,106 A | * | 12/1999 | Wilkins | 285/110 |

FOREIGN PATENT DOCUMENTS

WO WO-92/07165 4/1992

* cited by examiner

*Primary Examiner* — Kevin Lee
(74) *Attorney, Agent, or Firm* — Jackson & Co., LLP

(57) ABSTRACT

A subsea coupling comprises a male coupler having a probe and a female coupler comprising a socket for the reception of the probe. The couplers each include a valve which is openable on mating of the couplers to provide communication with the socket. The socket includes a recess accommodating an annular seal for providing a radial seal between the probe and the socket. In one embodiment the leading edge of the probe includes at least one relief channel for allowing the escape of hydraulic fluid entrapped between the probe, the seal and the recess when the couplers are made up. There may be a stand-off ring disposed between one end of the recess and the inner side of the seal. In another embodiment the relief channel is provided in the socket.

11 Claims, 8 Drawing Sheets

SUBSEA COUPLING

RELATED APPLICATIONS

The present application claims priority to Great Britain patent application no. 0818082.0 filed Oct. 3, 2008 and to Great Britain patent application no. 0914807.3 filed Aug. 25, 2009, the disclosures of each of which are incorporated herein by reference for all purposes.

FIELD OF THE INVENTION

This invention relates to subsea couplings, which are and have been in common use to provide sealing connection between hydraulic lines.

BACKGROUND

Subsea couplings normally comprise a female coupler and a male coupler. The couplers are usually self-sealing and for this purpose may include a respective poppet valve, disposed so that the poppets mutually engage when the male probe is inserted in the female receiver. It is necessary to provide radial sealing between the couplers and various forms of metal and elastomeric seals have been proposed for this purpose.

The make-up of a pair of couplers necessarily occurs under water and many proposed design of coupling suffer from their susceptibility to high makeup forces and/or the entrapment of hydraulic fluid as the couplers are made up.

One known form of seal is a 'C-seal', which denotes an annular seal with a C-section. Such a seal has usually been made of metal but it may be composed of a hard material such as 'PEEK'. Such a seal may be used as the primary radial seal between the couplers, and preferably used in conjunction with a secondary seal, providing a radial seal at a location spaced axially from the primary seal. The secondary seal may be a simple O-ring or a U-shaped elastomeric seal or an elastomeric or plastic 'cartridge' seal, comprising an O-ring with an encircling retaining ring of plastic or metal.

It is the general object of the invention to provide an improved subsea coupling.

SUMMARY

The invention provides in one aspect a subsea coupling comprising a male coupler having a probe and a female coupler comprising a socket for the reception of the probe, the couplers each including a valve which is openable on mating of the couplers to provide communication within the socket, in which the socket includes a recess accommodating an annular seal for providing radial sealing between the probe and the socket, and the coupling includes at least one relief channel disposed to allow the escape of hydraulic fluid entrapped by the seal within the recess when the couplers are made up. The recess, seal and relief channel are configured for this purpose. The relief channel may be provided on the probe but may alternatively be provided on an end face of the recess.

According to another aspect of the invention a subsea coupling comprises a male coupler having a probe and a female coupler comprising a socket for the reception of the probe, the couplers each including a valve which is openable on mating of the couplers to provide communication within the socket, in which the socket includes a recess accommodating an annular C-seal for providing radial sealing between the probe and the socket, further comprising a member which extends into the interior of the C-section of the C-seal to retain the C-seal in the recess while allowing the C-seal to change its sectional shape and thereby to allow egress of trapped fluid from a space between the exterior of the C-seal and the recess.

According to a further aspect of the invention a subsea coupling comprises a male coupler having a probe and a female coupler comprising a socket for the reception of the probe, the couplers each including a valve which is openable on mating of the couplers to provide communication within the socket, in which the socket includes an outer annular seal for providing radial sealing between the probe and the socket, the socket includes an inner O-ring seal disposed in an annular recess in the socket and providing radial sealing between the probe and the socket, and the coupling includes at least one relief channel disposed to allow the escape of hydraulic fluid otherwise entrapped by the O-ring seal within the recess while the couplers are made up.

DETAILED DESCRIPTION OF EXEMPLARY EMBODIMENTS

Figure 1:
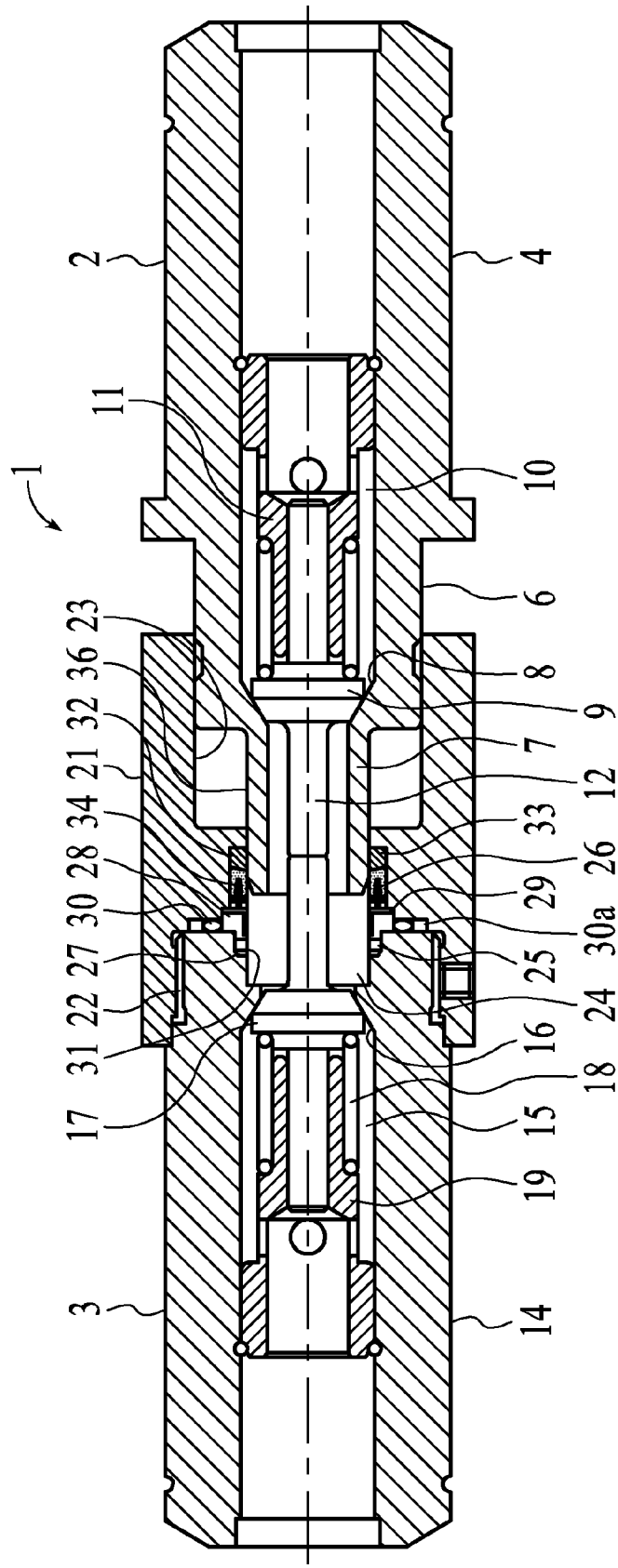
FIG. 1 is a sectional view of one embodiment of a coupling according to the invention.

FIG. 1 illustrates in side section a coupling 1 comprising a 'male' or 'probe' coupler 2 which is intended for use with a complementary 'female' or 'socket' coupler 3. The general configuration of the couplers can be varied quite widely and it is not intended to limit the invention to any particular arrangement of the couplers.

In FIG. 1, the male coupler 2 comprises a body 4 with an internal chamber 5. The body has an intermediate part 6 and a terminal probe 7. Within the chamber 5 is a valve seat 8 for a poppet valve 9 which is urged against the seat 8 by a compression spring 10 disposed on the outside of a shouldered sleeve 11 into which the shank of the poppet valve fits for sliding movement. The nose 12 of the poppet 9 can engage a nose on a similar poppet within the female coupler 3 now to be described. The rear 13 (the right-hand end as shown in FIG. 1) of the body 4 may be connected to a high-pressure hydraulic line (not shown).

The female coupler 3 comprises two main body parts. One body part 14 is a cylindrical part 14 which has an internal chamber 15 including a valve seat 16. Within the chamber is a poppet valve 17 generally similar to the poppet valve 9 and urged against the seat 16 by a compression spring 18 mounted on a shouldered sleeve 19 into which the shank of the poppet 17 fits for sliding movement.

When the couplers 2 and 3 are separated, the poppets 9 and 17 seal against their respective seats. When the couplers 2 and 3 are made up, the noses of the poppets 9 and 17 engage each other and are lifted from their seats to provide fluid communication between the couplers 2 and 3. The embodiment as thus far described is an example of a 'self-sealing coupling'.

The other part 21 of the female coupler 3 is a sleeve which has at its left-hand end an internal screw-threading 22 engaging a corresponding screw threading on the outside of the body part 14. The female coupler 3 is in two parts to enable the assembly of the seals to be described. The sleeve 21 defines an outer socket 23 which receives the intermediate part 6 of the male coupler 2 and the sleeve 21 and the body part 14 both define an inner socket 24 which receives the probe 7 of the male coupler 2.

In order to prevent leakage from the region between the couplers 2 and 3 and in particular the inner socket 24, it is necessary to provide seals between the couplers 2 and 3 and in particular between the probe 7 and the inner socket 24 of the female coupler 3.

Usually two seals are used subsea for safety redundancy, so that if one seal does not work the other will. Furthermore one seal can provide during make-up of the couplers as the poppets are opened, whereby the interior of the coupling is fully pressurised before the C-seal is engaged.

Two objectives associated with such seals are ensuring that they remain in place during unmating of the couplers and the avoidance of hydraulic lock when the couplers are made up. The present invention is intended to achieve both objectives.

Figure 2:
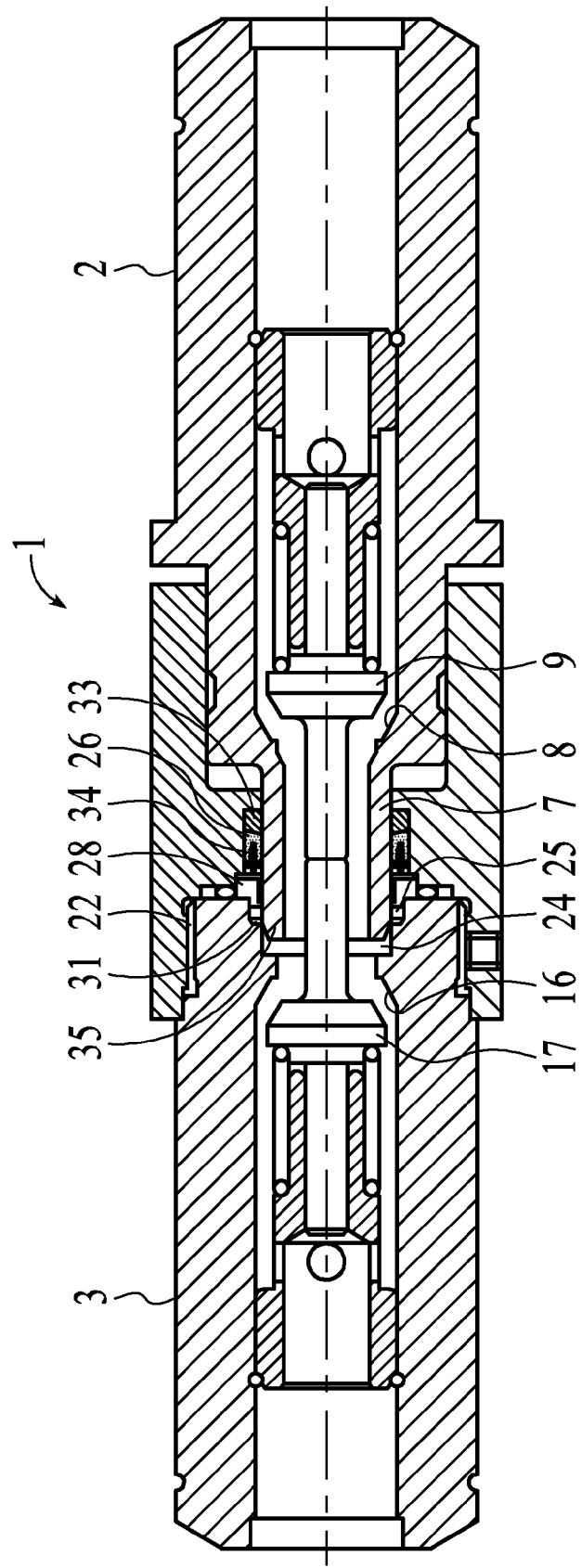
FIG. 2 is a sectional view of the embodiment shown in FIG. 1 but in a later stage of operation.

The embodiment shown in FIGS. 1 and 2 includes two seals, an inner or 'primary' radial seal constituted by a C-seal 25 and an outer or 'secondary' radial seal 26.

The C-seal 25, which may be of metal or a hard material such as PEEK, is disposed in an annular recess formed between an annular shoulder 27 near the outer end of the inner socket 24 and a retaining ring 28 which has a hub slightly protruding into the shoulder 27. This ring 28 is held between the body part 14 and a shoulder 29 of the sleeve 21. It has at least one pressure relief channel 29. Encircling the retaining ring 28 in the space between the body part 14 and the sleeve 21 are an O-ring seal 30 and a back up ring 30a.

In order to ensure that the C-seal 25 is held in place a member is disposed to engage the interior side of the C-seal. In this embodiment this member is a stand-off ring 31 disposed between the shoulder 27 and the inner side of the C-seal 25. This ring 31 also has another function as will be described later.

The secondary seal 26 is disposed in an annular recess 32 in the inner periphery of the sleeve 21. The 'base' of the U-section matches an oblique face of a packing ring 33 at the outer end of the recess 32 so that the packing ring 33 inhibits both radial and axial movement of the seal 26. A stand-off ring 34 is disposed between the retaining ring 28 and the interior notch in the U-section of the secondary seal 26.

FIG. 1 shows the coupling partly made up, the male probe 7 having just passed the secondary seal 26 and the noses of the poppets 9 and 17 just in engagement. FIG. 2 shows the coupling almost completely made up, the male probe 7 having passed the C-seal 25 and the poppets 9 and 17 having been lifted from their seats.

The leading edge of the male probe 7 has a bevelled face 35 (FIGS. 2 and 4) partly to facilitate the entry of the probe 7 into the inner socket 24, the rim 36 of which is also bevelled. Not shown in FIG. 1 or 2 but shown in FIG. 5 to be described is at least one slot or groove and preferably a plurality of such slots in the face 35 and circumferentially spaced apart around the leading edge of the probe 7. Each such slot constitutes a relief channel.

When the couplers 2 and 3 are made up and the probe 7 enters the inner socket 24, the probe 7 enters the secondary seal 26. There will be a substantial increase in the internal pressure since water is trapped in the inner socket 24. However, the increase in internal pressure will lift at least one of the poppets 9 and 17 and relieve the internal pressure so that make-up can continue.

Figure 3:
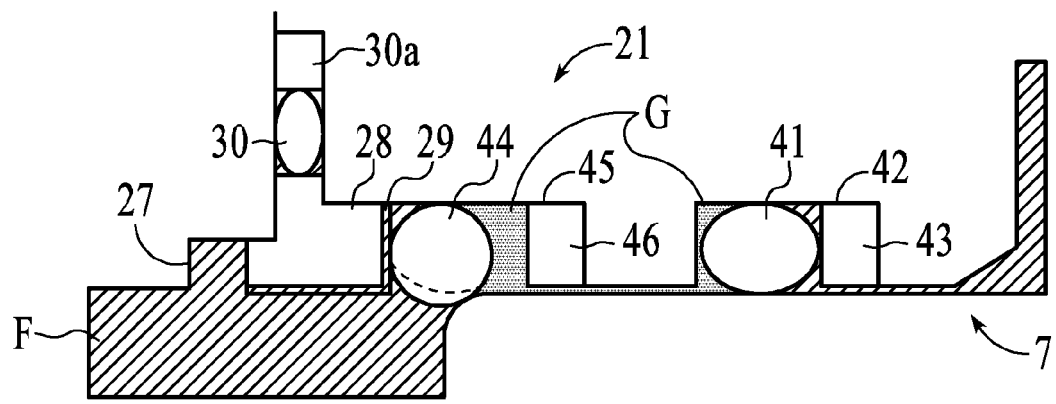
FIG. 3 is an explanatory diagram which shows a partially made-up coupling employing two O-ring seals.

In order to provide an explanation of the effect of trapped hydraulic fluid, FIG. 3 illustrates a coupling in which a secondary seal system comprises two spaced O-rings 41 and 44. A first O-ring 41 is disposed in an annular recess 42 on the inside of the part 21 and is provided with a back up ring 43. A second O-ring 44 is disposed in an annular recess 45 on the inside of the part 21 and is provided with a back up ring 46. In this drawing the C-seal 25 is omitted for convenience but if present would be in the recess between the shoulder 27 and the retaining ring 28 as previously described.

FIG. 3 illustrates a phase in which the probe 7 is engaging the secondary seal 26 (shown as a cartridge seal). Hydraulic fluid F is shown in this and subsequent Figures by respective cross-hatching. As the male probe 7 enters the first seal 41 every thing behaves as it would in air, this seal expanding by (typically) 0.2 mm radially. In water however the next 1 mm of stroke would pressurise the volume between the poppets 9 and 17 (if they are not yet pushed open) to line pressure, which may be for example 500 bar. The situation is greatly changed; the O-ring now behaves as a solid object in as much as it is totally contained. Under the hydrostatic pressure now prevalent, it will compress less in volume than other parts of metal or plastic.

When the male probe 7 attempts further make-up motion, water G is trapped and cannot escape via the line, then such motion may be prevented and high trapped pressure generated. To move into the second seal 26 the male probe 7 must expand the second seal 0.2 mm radially as it did the first. The volume of the second O-ring 44 displaced by 0.2 mm would be (for example) $0.2 \text{ mm} \times 2 \times 0.5 \times \pi \times 16 \text{ mm} = 10 \text{ mm}^3$. An estimate of the possible volume of trapped fluid is 90 mm$^3$ which if it were compressed by the 10 mm$^3$ would raise the trapped pressure by 2500 bar. This would deform any metallic or similar seal trying to contain it and/or prevent the coupling making up to this position. The quoted numerical example is for PEEK O-rings and would be different if other materials or seals were used.

Figure 5:
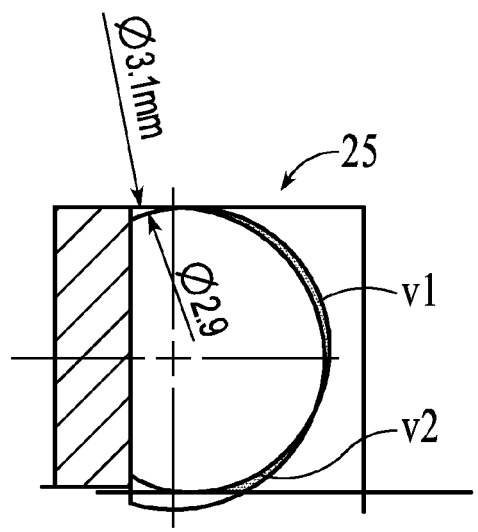
FIG. 5 is an explanatory diagram illustrating the C-section seal.

The condition of hydraulic lock may be alleviated by the relief channels in the leading edge of the probe and as shown in FIG. 5.

Figure 4:
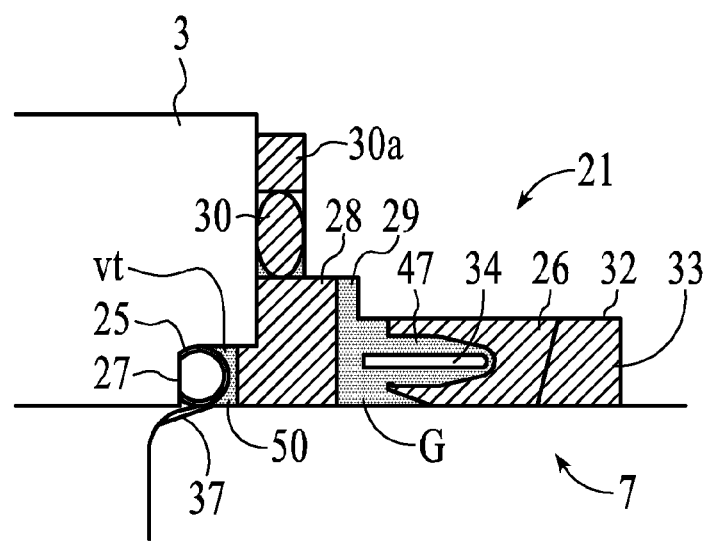
FIG. 4 is an explanatory diagram which shows a partially made-up coupling employing a U-section elastomeric seal.

FIG. 4 is a detail of the embodiment of FIGS. 1 and 2, wherein the secondary seal 26 is a U-section seal held against the packing ring 33 in the recess 32 by the stand-off ring 34 and (preferably) an annular clip between the stand-off ring 34 and the secondary seal 26. The arms of the U are in the direction of insertion of the probe, so as to facilitate both mating and un-mating of the couplers 2 and 3.

Although hydraulic fluid (shown by the cross-hatching G) is still trapped, the pressure increase as described with reference to FIG. 3 does not occur, partly by virtue of the arrangement of the secondary seal 26 and partly by virtue of the relief channels in the leading edge of the probe.

If therefore makeup can proceed beyond the secondary seal a stage as shown in FIGS. 4 and 5 is reached. At this stage, the male probe 7 touches, and starts to seal, on the C-seal 25. This, as shown in FIG. 5, traps hydraulic fluid in the space 50 bounded by the probe 7, the body part of the female coupler 3, the retaining ring 28 and the C-seal 25. FIG. 4 shows the original shape of the C-seal 25 changing to suit the outside diameter of the probe 7. Typically the diameter of the C-section changes from 3.1 mm to 2.9 mm. When the C-seal 25 is, necessarily, pushed against the radial face of its recess, the change in diameter of the C-seal 25 requires a change in the trapped volume. The change may be expressed as (−v1+v2) where v1 is the change over the convex side of the C-seal 25 and the volume v2 is the change at the inner periphery of the C-seal 25. The volume v1 is much greater than the volume v2 so there is a tendency to compress the entrapped fluid. In other circumstances, owing to the substantial incompressibility of the hydraulic fluid the fluid would have to distort the C-seal 25 to escape into the hydraulic line. On full make-up the C-seal 25 might be permanently deformed so that it would cease to seal properly.

Typically, in a small coupling the trapped volume 'vt' (FIG. 4) may be of the order of 200 mm$^3$ while the changes of volume 'v1' and 'v2' due to the change of shape of the sealing C-seal 25 are v1=−69 mm$^3$ and v2=+13 mm$^3$, making a net compression of the trapped fluid −56 mm$^3$. This would compress the trapped 200 mm$^3$ to 6000 bar. In this instance because the pressure is on the back of the C-seal 25 it would deform and let the fluid pass into the line but whether the C-seal 25 would seal properly afterwards is questionable.

The provision of the relief channel 37 or channels constituted by the slot or slots in the face 35 allows the escape of the hydraulic fluid that would otherwise be trapped in the space 50 bounded by the probe 7, the body part of the female coupler 3, the retaining ring 28 and the C-seal 25.

The relief channels 37 have the further advantage that on de-mating of the couplers they provide a passage for incoming water past the seals and avoid the danger of displacement of the seals. This is particularly important if the secondary seal 26 is constituted by one or more O-rings 41 and 44.

Each relief channel 37 may be formed as an angled flat rather than as a pure slot.

Figure 6:
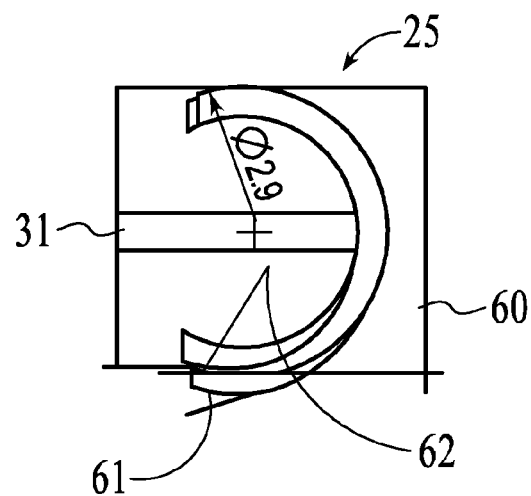
FIG. 6 is another explanatory diagram illustrating the C-section seal.

FIG. 6 illustrates the stand-off ring 31 in engagement with the interior face of the C-section of the C-seal 25. It constrains the C-seal 25 to change shape (with a lessening of the diameter of the C-section) and may thereby prevent the C-seal 25 in this configuration from trapping pressure in the space 60 between the outside of the seal and the recess. Any C-seal shape change causing expansion of fluid causes rapid pressure loss and possibly a vacuum in the trapped fluid, but that is not a significant problem. The original curve of the C-seal 25 is denoted 61 and the final curve of the C-seal 25 is denoted 62.

Figure 7:
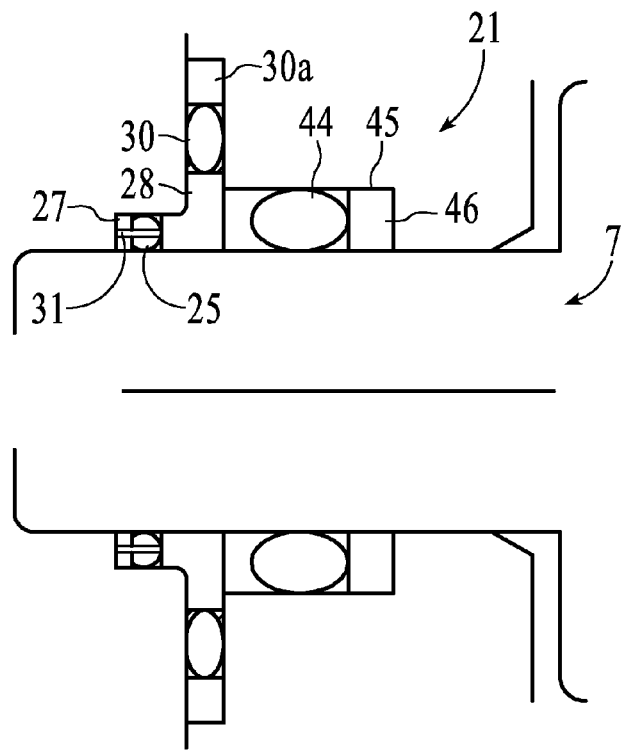
FIG. 7 is a simplified diagram illustrating another embodiment of the invention.

FIG. 7 illustrates another embodiment of the invention. In this embodiment, which other wise resembles that shown in FIG. 3, there is a single O-ring secondary seal 44 with its back up ring 46 in the recess 45. The C-seal 25 is held in its recess by the ring 31 as before.

Figure 8:
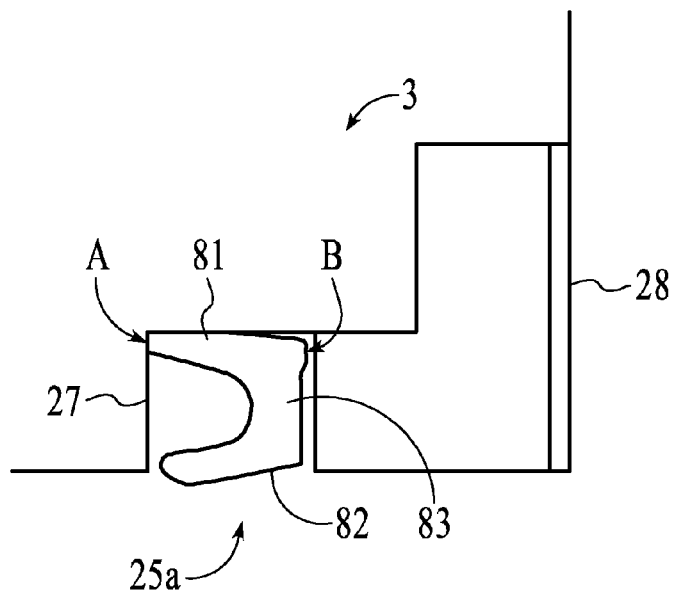
FIG. 8 is a diagram illustrating another form of C-seal.

FIG. 8 illustrates another version of the C-seal 25a which is particularly suitable if the C-seal 25a comprises an 'engineering plastic' such as PEEK. Such a material approach metals in strength and possess much better resistance to corrosion.

The C-seal 25a in FIG. 8 is also adapted to be a close fit in the recess defined by the body of the female coupler 3, the shoulder 27 and the retaining ring 28. The C-seal 25a is asymmetric, having an outer limb 81 which laterally abuts the side of the recess, an inner limb 82, which is shorter than the outer limb 81 and a connecting base 83. The outer face of the outer limb 81 may have V-grooves to aid sealing against the body of the female coupler 3. The face A at the end of the outer limb 81 and the face B at the outer margin of the base 83 preferably lie flat against the shoulder 27 and the retaining ring 28 respectively.

The faces A and B may be relieved at their corners to permit such flat lying. The surface of the base inwards of the face B preferably has a clearance from the ring 28 to allow flexure of the inner limb 82. The terminal lip of the limb 82 may be radiussed to produce an optimum sealing surface despite working tolerances in the sealing position. The conventional C-seal is usually permitted a small axial freedom of movement but this asymmetric seal may permit an axial clamping of the outer limb, preventing axial motion and possibly permitting sealing at these faces.

The shape of the C-seal 25a shown in FIG. 8 may avoid the need for a stand-off ring such as the ring 31 shown in FIGS. 1 and 2.

Figure 9:
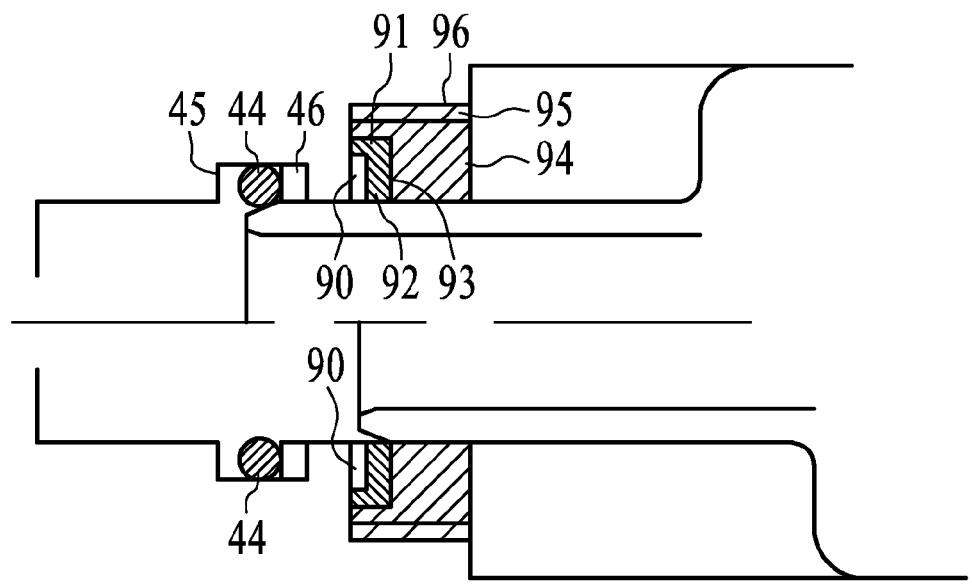
FIG. 9 illustrates a modification of the coupling.
Figure 10:
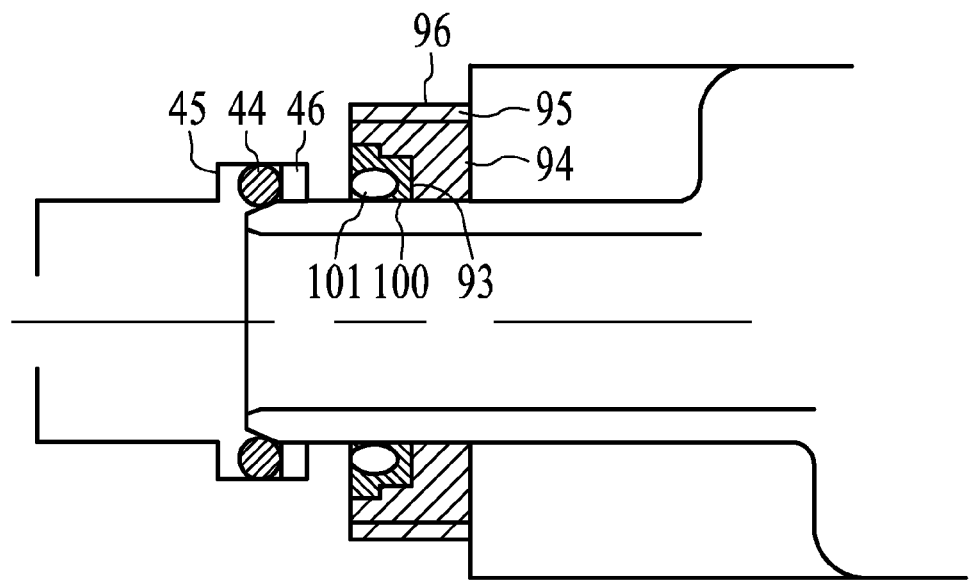
FIG. 10 illustrates another modification to the coupling.

FIGS. 9 and 10 are simplified views which illustrate in simplified form modifications to the coupling as previously described. Both modifications employ an O-ring advantageously as a secondary seal. In both FIGS. 9 and 10 the secondary O-ring seal is denoted 44. It is located in an annular recess in the inner periphery of the female coupler and has a back-up ring 46.

In FIG. 9 the primary seal is a seal 90 of PEEK or other engineering plastic. It comprises an outer ring 91 and an inward lip 92. It is located in a recess 93 of a retaining plug 94 which is located in a shoulder 95 of the female coupler and has a screw-threading on its outer side to engage a corresponding threading 96 in the shoulder 95.

FIG. 9 is split into two halves, one above the other. The lower half shows the probe 7 of the male coupler about to engage the primary seal 90. The upper half shows the probe 7 engaging and flexing the primary seal and about to engage the secondary O-ring seal 90. The probe has relief channels (not shown) as previously described.

FIG. 10 is similar to the upper view in FIG. 9 but here the primary seal 100 comprises a stepped annulus of PEEK or other engineering plastic incorporating a pressurised ring 101.

Both FIGS. 9 and 10 show examples of seals which can allow external fluid to pass by the seal when the couplers are de-mated. During the separation of a coupling the creation of a vacuum in the coupling when the poppet valves close is opposed by depth pressure resisting extraction. The design shown in FIG. 10 provides a seal which has a definite let-by pressure, for example permitting ingress into the vacuum at a differential pressure of 50 bar. Such would reduce the extraction force to a negligible value.

The design shown in FIG. 9 provides sealing through some elasticity of the basic material and some pressure energising effect due to the curving of the seal when the probe enters and opens the poppet under line pressure.

In both FIG. 9 and FIG. 10 the screwed plug 94 traps the outer part of the primary seal (90 or 100) and effectively makes this part into a static seal.

Figure 11:
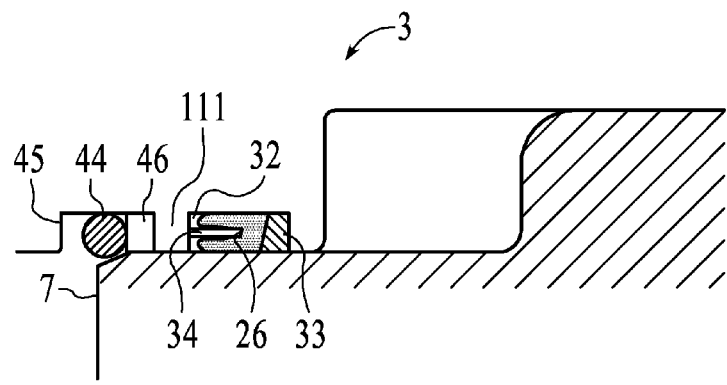
FIGS. 11-13 illustrate a coupling which includes an O-ring seal and in successive stages of make-up.
Figure 12:
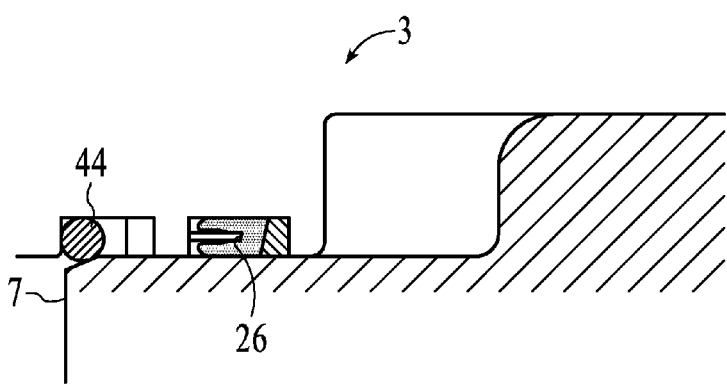
Figure 13:
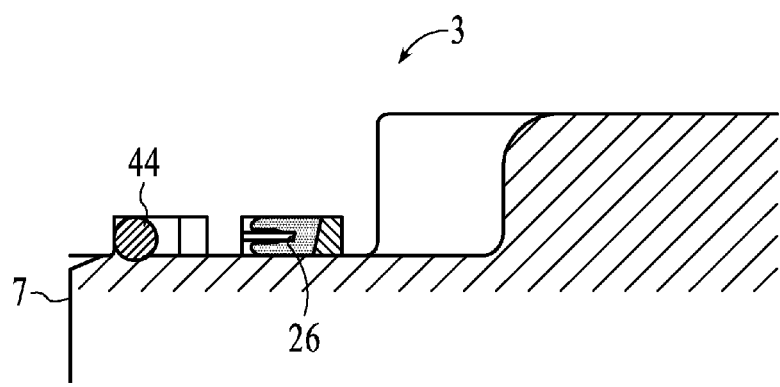

FIGS. 11-13 illustrate in simplified form an embodiment which generally resembles that shown in FIG. 1 but having the sleeve integrally formed in the body of the socket coupler 3. These Figures particularly include an O-ring seal as the secondary or 'inner' seal.

The outer seal 26 is disposed in an annular recess 32 in the inner periphery of the socket coupler 3. A packing ring 33 is located at the outer end of the recess 32 so that the packing ring inhibits both radial and axial movement of the seal 26, and a stand-off ring 34 is disposed between the interior notch in the U-section of the seal 26 and an internal shoulder 111 of the socket coupler 3. An inner seal comprises an O-ring seal 44 which is disposed in an annular recess 45 and has a backup ring 46 as previously shown in FIGS. 9 and 10. In this example the male probe 7 is not shaped with leading relief channels as previously described; instead a relief channel is provided elsewhere as indicated below.

In the stage shown in FIG. 11 the probe 7 has passed through the (outer) lip seal 26 and is shown just striking the bore of the back-up (inner) O-ring seal 44. The poppets (not shown) of the couplers have not yet touched so the couplers are not yet open and all the spaces are filled with sea water at the depth pressure.

Figure 14:
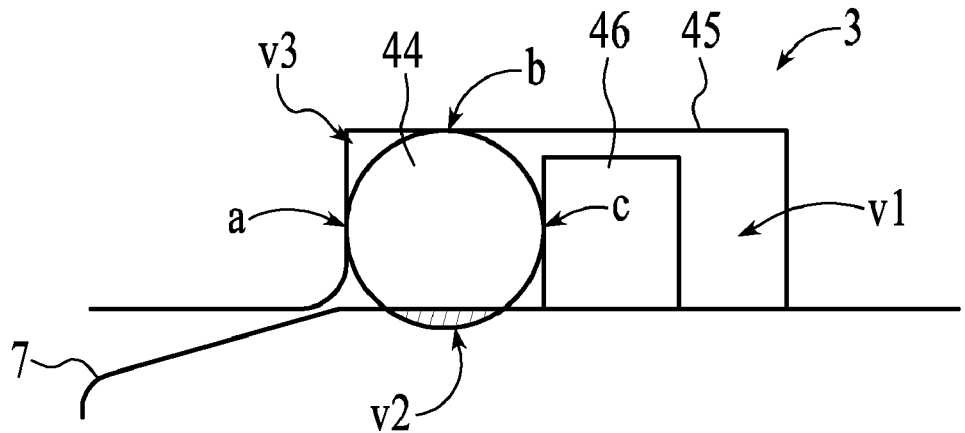
FIGS. 14 and 15 are explanatory diagrams relevant to the O-ring seal in FIGS. 11-13.

Further make-up of the probe 7 carries the O-ring 44 and its back-up ring 46 to the left-hand end of the recess 45, as shown in FIG. 12. The O-ring seal 44 has now three contact regions, against the left-hand end of the recess (denoted a in FIG. 14), against the periphery of the recess (denoted b in FIG. 14) and against the probe 7.

FIG. 13 shows the probe 7 having moved to a position in which the poppets touch but without yet opening the couplers, so fluid line pressure is not yet present in the various spaces. The condition is shown to a larger scale in FIG. 14, which shows that a volume v2 of the O-ring seal 44 has to be displaced. However, in these pressured conditions the rubber or other elastomer of the O-ring 44 is practically incompressible. The volume v1 between the probe 7, the outer side of the O-ring 44 and back-up ring 46, and the recess 45 is a trapped volume which will not change in the absence of extremely high pressure. Volume v3 between the O-ring 44 and the left-hand end of the recess 45 is also a trapped volume. Accordingly in the absence of the relief channels in the probe 7 the volume v2 of the O-ring 44 would be liable to be sheared off.

Figure 15:
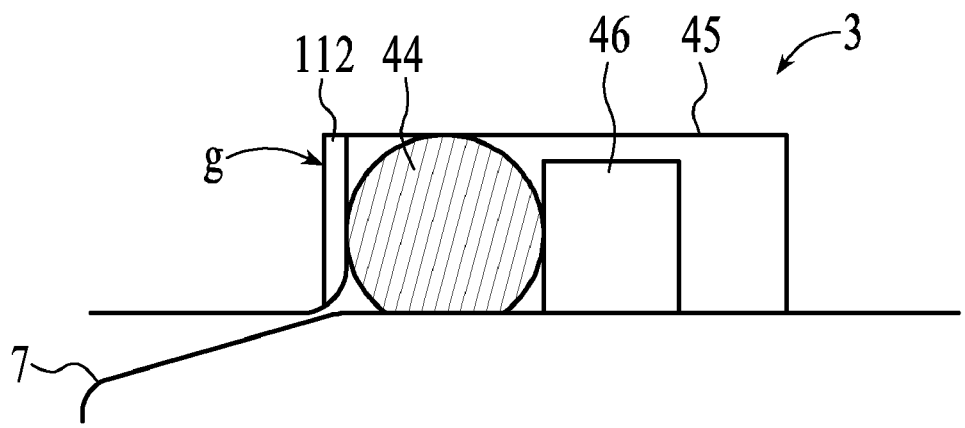

FIG. 15 shows the addition of a relief groove 112 in the left-hand (inner) face of the recess 45. This prevents the sealing in the region. Then volume v3 (FIG. 14) is not a trapped volume and the O-ring 44 can reshape, the volume v2 being transferred into the space v3 without damage to the O-ring 44.

What is claimed is:

1. A subsea coupling, comprising:
a male coupler having a probe; and
a female coupler comprising a socket for the reception of the probe,
wherein the couplers each include a valve which is openable on mating of the couplers to provide communication within the socket;
wherein said socket includes a first annular seal for providing radial sealing between said probe and said socket;
wherein said socket includes an annular recess accommodating a second annular seal for providing radial sealing between the probe and the socket, said second annular seal configured to trap hydraulic fluid within said annular recess when said couples are being mated; and
wherein the coupling includes at least one relief channel disposed in at least one of a face of said annular recess and an outer surface of said probe to allow the escape of hydraulic fluid entrapped by the second annular seal within the said recess when the couplers are made up.

2. The subsea coupling of claim 1 wherein a leading edge of the probe has a bevelled face and the relief channel is a slot in the bevelled face.

3. The subsea coupling of claim 1 wherein the said second annular seal is a metal C-seal, and further comprising a member which extends into an interior of a C-section of the C-seal to retain the C-seal in the recess.

4. The subsea coupling of claim 3 wherein said member is a stand-off ring disposed between one end of the recess and an inner side of the C-seal.

5. The subsea coupling of claim 1 wherein the female coupler comprises two body parts, a first of the two body parts including said recess and a sleeve defining an outer socket for the reception of part of the male coupler, and a retaining ring disposed between the said main body parts and defining an end of said recess.

6. The subsea coupling of claim 1 wherein said second annular seal is an elastomeric O-ring seal.

7. The subsea coupling of claim 6 wherein a leading edge of said probe has a bevelled face and said relief channel is a slot in said bevelled face.

8. The subsea coupling of claim 6 wherein said recess has an end face and said relief channel is provided in said end face of the recess.

9. A subsea coupling, comprising:
a male coupler having a probe; and
a female coupler comprising a socket for the reception of the probe;
wherein the couplers each include a valve which is openable on mating of the couplers to provide communication within the socket, said socket including an outer annular O-ring elastomeric seal for providing radial sealing between the probe and the socket;
wherein the socket includes an inner O-ring elastomeric seal disposed in an annular recess in the socket and providing radial sealing between the probe and the socket, said inner O-ring elastomeric seal configured to trap hydraulic fluid within the recess when the couplers are being mated; and further
wherein the coupling includes at least one relief channel disposed to allow the escape of hydraulic fluid entrapped by the inner O-ring elastomeric seal within the recess when the couplers are being mated.

10. The subsea coupling of claim 9 wherein the relief channel is provided in an end face of the recess.

11. The subsea coupling of claim 9 wherein the valves comprise mutually openable poppets each urged towards a respective valve seat within a respective coupler.

* * * * *